April 18, 1967  M. G. McHUGH  3,314,636
RELEASABLE SUSPENSION DEVICE FOR SWING SEAT
Filed May 26, 1965
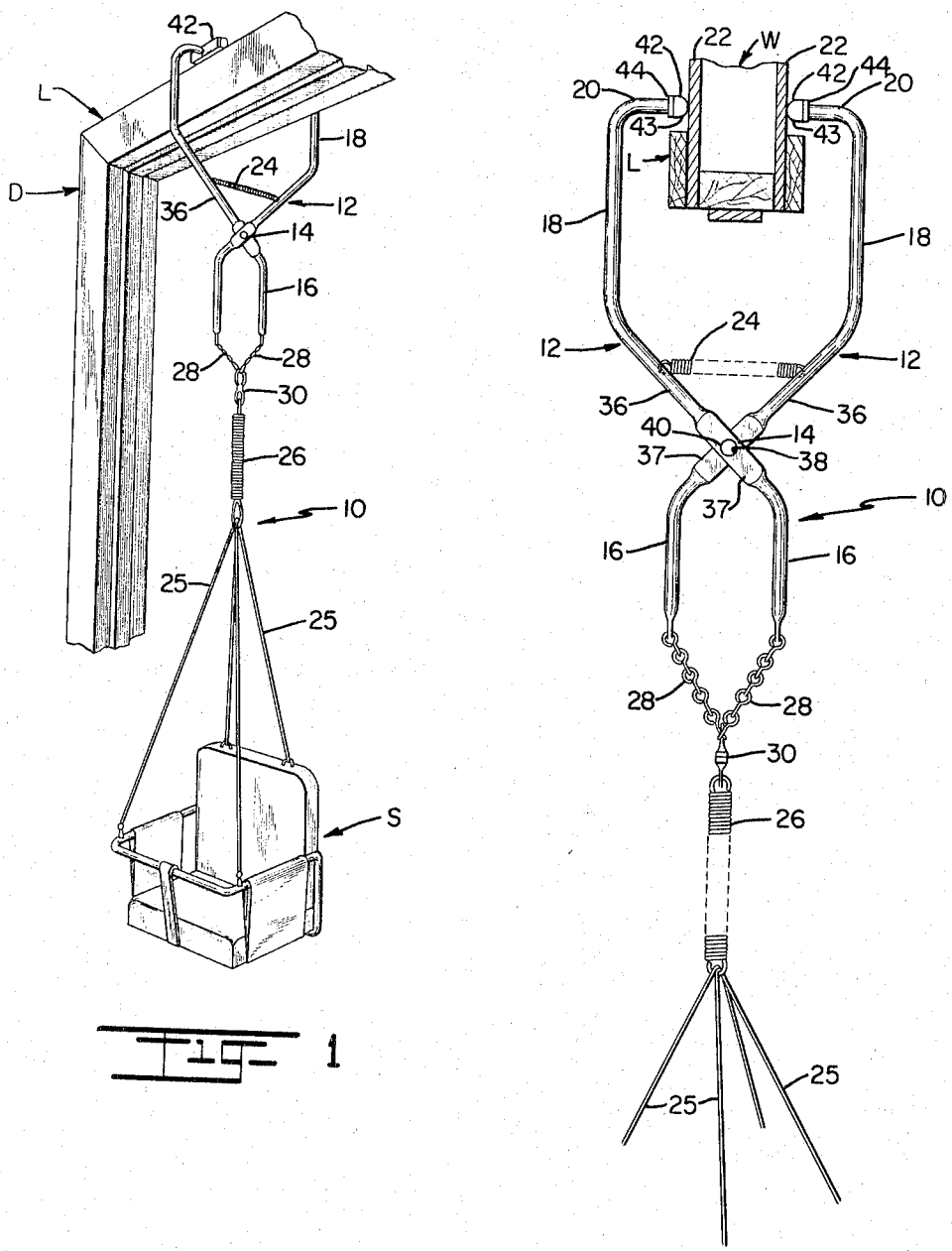
INVENTOR.
MAURICE GORDON MCHUGH
BY
ATTORNEY

United States Patent Office 3,314,636
Patented Apr. 18, 1967

3,314,636
RELEASABLE SUSPENSION DEVICE FOR SWING SEAT
Maurice Gordon McHugh, Hanover, Ill.
(25 E. Thorndale Ave., Roselle, Ill. 60172)
Filed May 26, 1965, Ser. No. 458,947
2 Claims. (Cl. 248—340)

This invention relates to a novel and improved manner and means for releasably suspending a swing seat, such as, for example an infant seat or jumper from an overhead support; and more particularly relates to a clamping member for releasably suspending a swing seat in a doorway in a safe dependable manner.

It is a principal and foremost object of the present invention to provide an improved device for releasable suspension of an infant's swing seat from an overhead support and specifically wherein the device is adapted to releasably but firmly engage opposite sides of a wall above an overhead door frame without the use of special connecting elements or other positive means of attachment, and in such a way that the holding pressure of the device is increased under the weight of an infant or child without marring or otherwise damaging the wall surfaces.

It is another object of the present invention to provide a suspension device for infant seats and the like characterized by having a novel and improved clamping member which may be releasably secured in firm gripping engagement above a door frame or other suitable overhead support, and the suspension device being useable either singly or in combination for supporting infant seats, swings, jumpers or the like.

It is a further object of the present invention to provide a device for releasably suspending a swing seat from overhead supports of different thicknesses and heights and being characterized by yieldingly but firmly gripping opposite flat-sided surfaces of the support without slipping or accidental release.

The above and other objects, advantages and features of the present invention will become more readily appreciated and understood from a consideration of the following description when taken together with the accompanying drawings, in which:

FIGURE 1 is a perspective view of a preferred form of suspension device for an infant seat, in accordance with the present invention; and FIGURE 2 is an enlarged view partially in section, illustrating the disposition and arrangement of the preferred form of suspension device in connected relation above an overhead door frame.

Referring in detail to the drawings, there is shown by way of illustrative example a suspension device generally designated at 10 for releasably suspending a swing seat represented at S from an overhead door frame D. As shown, the seat S is merely representative of various seat members or swings which may be supported by the device of the present invention, for example, in a doorway or from other suitable means of overhead support. Broadly, the suspension device 10 is comprised of upper clamping members defined by correspondingly formed intersecting suspension arms 12 which are pivotally interconnected as at 14 to provide downwardly extending lever arm portions 16 and upwardly extending lever arm portions 18. Arm portions 18 terminate in upper clamping end portions 20 to firmly but yieldingly engage opposite sides 22 of a wall W located above the ledge portion L of the door frame D under the urging of a tension spring 24 extending between the upper arm portions 18. In addition, various suitable connection means may be utilized to suspend the infant seat S from the upper clamping members 12, and as illustrated rope strands 25 are connected to opposite sides of he seat S and are joined together at their upper ends for connection to the lower end of a coiled spring 26. It will be noted that a pair of chains 28 extend upwardly from a ring member 30 at the upper end of the spring 26 into connected relation with the lower arm portions 16, and in this way the chains will permit the lower arm portions 16 to be drawn inwardly so as to increase the holding pressure of the clamping end portions 20 against the wall. Thus, the greater the weight or downward pull, the greater will be the inward clamping force exerted by the upper end portions 20 against the wall surfaces, it being noted in particular that the clamping end portions would bear firmly against the vertical wall surfaces as opposed to hanging from the ledge portion L.

Considering in more detail the construction and arrangement of the suspension arm members 12, each is preferably formed of an elongated, heavy-duty metal rod which is bent to define an intermediate angularly extending portion 36 joining the lower and upper arm portions 16 and 18, respectively. Each intermediate portion 36 includes a flattened surface 37 provided with an opening 38 for insertion of a pivot pin 40 to pivotally interconnect the clamping members in crossed or intersecting relation. Most desirably, the pivot point is located relatively near the lower arm portions and away from the upper arm portions 18, and in this way the lower arm portions 16 are shortened in relation to the upper arm portions 18 so that the moment of the downward pull or weight applied across the lower arm portions is reduced according to the increased length of the upper arm portions in forcing the upper clamping ends 20 into gripping engagement with the wall surfaces. For instance, in the relationship shown, the relative length of the arms is such that approximately one-half of the weight of the child added to the force of the spring member 24 is transmitted across the upper clamping end portions against the wall surface and which is normally adequate to assure firm gripping engagement without damaging the wall surface.

In the preferred form, the upper clamping end portions 20 are bent inwardly toward one another in a horizontal direction from the upper arm portions 18, and each is provided at its inner extremity with a flexible pad 42. As illustrated, each pad member 42 is enlarged or of an increased width in order to establish an increased bearing surface area for engagement with the wall and, for example, may be composed of a hard rubber or plastic material having a high coefficient of friction so as to yieldingly but frictionally engage the wall surface to prevent slipping of the end portions once in place. Here the pads are shown as being oblong with rounded wall-contacting surfaces 43 and may be permanently attached to an oblong connecting plate 44 at the inner extremity of each clamping end portion. In this relation, the upper clamping end portions 20 are dimensioned to extend inwardly from the upper arm portions 18 a sufficient extent to insure ample clearance for ledge portions of different trim thicknesses, as well as to make the device readily conformable for attachment to different overhead supports.

In accordance with the present invention the clamping members 12 are dimensioned in accordance with standard wall thicknesses such that in clamping relation to the wall the upper and lower arm portions are aligned in spaced parallel relation to one another. To position the members in place, it is merely necessary to grasp the lower arm portions 16 and force them outwardly away from one another, overcoming the tension of the spring 24, to spread the upper clamping end portions sufficiently for passage over the ledge L into position against the wall surface with the infant seat S suspended at the desired height from the floor. An advantage here is that the clamping end portions will afford a wide latitude of vertical adjustment in order to suspend the infant seat S at the desired distance above the floor. Upon releasing the lower arms, the tension spring 21 will automatically force the camping end portions into firm gripping engagement with the wall; and when a child is placed on the seat the increased weight will increase the holding pressure of the clamping end portions to resist any tendency of the end portions to slip or shift in any way. The device is quickly and easily releasable again by moving the lower arm portions apart to spread the upper arms portion for removal.

It will be evident from the foregoing that the suspension device of the present invention is conformable for use in suspending a swing seat, jumper and the like from various overhead supports; also, a pair of suspension devices may be employed in combination, for example, by placing the suspension devices in spaced side-by-side relation for connection to opposite sides of the seat. Of course various other modifications may be made in the particular construction and arrangement of elements in the preferred form of invention as herein illustrated and described without departing from the spirit and scope of the present invention as defined by the appended claims.

What is claimed is:

1. A suspension device for releasably suspending an infant seat and the like from opposite sides of a wall above an overhead door frame comprising, a pair of pivotally interconnected suspension arm members each having upper and lower, vertically extending arm portions and an intermediate angular portion joining the upper and lower arm portions of each suspension arm member, said angular portions being pivotally interconnected relatively near said lower arm portions and away from said upper arm portions, whereby the moment of downward force applied across said lower arm portion is reduced when applied across said upper arm portions in accordance with the increased length of said upper arm portion with respect to said lower arm portions, said upper arm portions each terminating in an upper clamping end portion arranged for inward extension toward the other clamping end portion, flexible connecting means for suspension of the infant seat in downwardly depending relation from the lower terminal ends of said lower arm portions, and a tension spring between said upper arm portions being biased to normally urge said upper clamping end portions into clamping engagement with opposite sides of the wall above the overhead frame.

2. In a suspension device for releasably suspending an infant seat and the like from opposite sides of a wall above an overhead door frame, a pair of pivotally interconnected suspension arm members each having upper and lower, vertically extending arm portions and an intermediate angular portion joining the upper and lower arm portions of each suspension arm member and said angular portions being pivotally interconnected relatively near said lower arm portions and away from said upper arm portions, said upper arm portions each terminating in an upper clamping end portion arranged for inward horizontal extension toward the other clamping end portion and an enlarged, wall-engaging pad at the inner extremity of each clamping end portion, flexible connecting means for suspension of the infant seat in downwardly depending relation from said suspension arm members, said flexible connecting means each including a chain portion extending downwardly from the lower terminal end of each lower arm portion, a coiled spring having an upper end interconnecting lower ends of said chain portions, and suspension ropes extending from the lower end of said coiled spring for connection to opposite sides of the seat whereby said upper clamping end portions are movable into clamping engagement with opposite sides of the wall above the overhead door frame under the weight applied to the infant seat.

References Cited by the Examiner

UNITED STATES PATENTS

| 153,684 | 8/1874 | Shoeninger | 297—181 |
| 216,624 | 6/1879 | Mayo et al. | 348—340 |
| 494,868 | 4/1893 | Kelly | 248—228 X |
| 1,493,913 | 5/1924 | Whiteside | 248—358.1 X |
| 2,476,635 | 7/1949 | Southwick | 248—228 |
| 2,631,803 | 3/1953 | Meyers | 248—215 |

CHANCELLOR E. HARRIS, *Primary Examiner.*

JOHN PETO, *Examiner.*